United States Patent
Abdel-Baset

(10) Patent No.: US 9,366,203 B2
(45) Date of Patent: Jun. 14, 2016

(54) CONFORMABLE HIGH PRESSURE GASEOUS FUEL STORAGE SYSTEM HAVING A GAS STORAGE VESSEL WITH FRACTAL GEOMETRY

(71) Applicant: Tarek Abdel-Baset, Windsor (CA)

(72) Inventor: Tarek Abdel-Baset, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 175 days.

(21) Appl. No.: 14/034,620

(22) Filed: Sep. 24, 2013

(65) Prior Publication Data

US 2015/0083733 A1    Mar. 26, 2015

(51) Int. Cl.
| | |
|---|---|
| B65D 88/12 | (2006.01) |
| B60P 3/00 | (2006.01) |
| B62D 33/00 | (2006.01) |
| F02M 21/02 | (2006.01) |
| B60K 15/03 | (2006.01) |

(52) U.S. Cl.
CPC ...... *F02M 21/0221* (2013.01); *B60K 15/03006* (2013.01); *F17C 2201/0138* (2013.01); *F17C 2201/0166* (2013.01); *F17C 2201/0171* (2013.01); *F17C 2201/058* (2013.01); *F17C 2203/066* (2013.01); *F17C 2205/0146* (2013.01); *F17C 2221/012* (2013.01); *F17C 2221/033* (2013.01); *F17C 2223/0123* (2013.01); *F17C 2223/036* (2013.01); *F17C 2260/017* (2013.01); *F17C 2270/0178* (2013.01); *Y02T 10/32* (2013.01)

(58) Field of Classification Search
CPC .............. F02M 21/0221; F02M 21/0245
USPC .............. 220/4.12, 4.14, 564, 562, 507, 501
See application file for complete search history.

(56) References Cited

U.S. PATENT DOCUMENTS

| | | | | |
|---|---|---|---|---|
| 2,395,802 | A * | 3/1946 | Bramson | 222/63 |
| 3,166,212 | A * | 1/1965 | Resos | 220/23.4 |
| 3,414,153 | A | 12/1968 | Leroux | |
| 3,645,415 | A | 2/1972 | Phelps | |
| 4,090,476 | A * | 5/1978 | Rybar | F23C 99/006 122/367.4 |
| 4,359,448 | A * | 11/1982 | Schuurman | B01J 8/1836 165/104.16 |
| 4,494,484 | A * | 1/1985 | Ruzek | F22B 1/1838 122/335 |
| 4,508,677 | A * | 4/1985 | Craig | G21C 1/322 376/171 |
| 4,961,699 | A * | 10/1990 | Moore | 425/387.1 |
| 5,056,472 | A * | 10/1991 | Kurokawa et al. | 123/54.8 |
| 5,072,583 | A * | 12/1991 | Urushihara | F01N 13/107 60/313 |
| 5,081,962 | A * | 1/1992 | Kurokawa | F02B 27/00 123/184.36 |

(Continued)

FOREIGN PATENT DOCUMENTS

EP    0633422 A1    1/1995

*Primary Examiner* — Nathan J Newhouse
*Assistant Examiner* — Jennifer N Zettl
(74) *Attorney, Agent, or Firm* — Ralph W. Smith

(57) ABSTRACT

In accordance with an aspect of the present disclosure, a conformable high pressure gas fuel storage system has a high pressure gaseous storage vessel with a central section disposed between end sections and in fluid communication therewith. The end and central sections have hollow geometric objects. The geometric objects have self-similarity providing the gas storage vessel with a fractal geometry. Each geometric object of each end section branches into a plurality of the geometric objects of the central section. The geometric objects of the central section have a smaller cross-section and thinner outer wall than the geometric objects of the end sections. The geometric objects of at least the central section are formable with bends to a configuration to conform the gas storage vessel to a space in a vehicle in which the gas storage vessel is packaged.

16 Claims, 4 Drawing Sheets

(56) References Cited

U.S. PATENT DOCUMENTS

| | | | |
|---|---|---|---|
| 5,163,409 A | 11/1992 | Gustafson et al. | |
| 5,615,702 A * | 4/1997 | Dawans et al. | 137/255 |
| 5,845,879 A * | 12/1998 | Jensen | 244/135 R |
| 6,095,367 A * | 8/2000 | Blair et al. | 220/581 |
| 6,398,055 B1 * | 6/2002 | Ostholt | 220/23.4 |
| 6,412,650 B1 | 7/2002 | Warner | |
| 6,418,962 B1 | 7/2002 | Wozniak et al. | |
| 6,519,950 B2 * | 2/2003 | Pelloux-Gervais et al. | 62/45.1 |
| 6,796,453 B2 * | 9/2004 | Sanders | 220/581 |
| 7,069,730 B2 | 7/2006 | Emmer et al. | |
| 7,131,553 B2 * | 11/2006 | Sanders | 220/581 |
| RE41,142 E * | 2/2010 | Blair et al. | 220/581 |
| 7,699,187 B2 * | 4/2010 | Korsgaard | 220/581 |
| 7,708,161 B2 * | 5/2010 | Barton | 220/507 |
| 8,051,977 B2 * | 11/2011 | Fujita et al. | 206/0.7 |
| 8,100,151 B2 * | 1/2012 | Handa | 141/82 |
| 2005/0016185 A1 * | 1/2005 | Emmer et al. | 62/50.1 |
| 2007/0194471 A1 * | 8/2007 | Nagaoka | B01D 3/008 261/100 |
| 2008/0272130 A1 * | 11/2008 | Abdel-Baset | 220/586 |
| 2010/0162749 A1 * | 7/2010 | Yoshimura | F25B 40/00 62/498 |
| 2010/0229841 A1 | 9/2010 | Nakayama | F02M 25/0718 123/568.11 |
| 2010/0254891 A1 * | 10/2010 | Giroudiere | B01J 8/062 423/648.1 |
| 2013/0008558 A1 * | 1/2013 | Cajiga et al. | 141/12 |

* cited by examiner

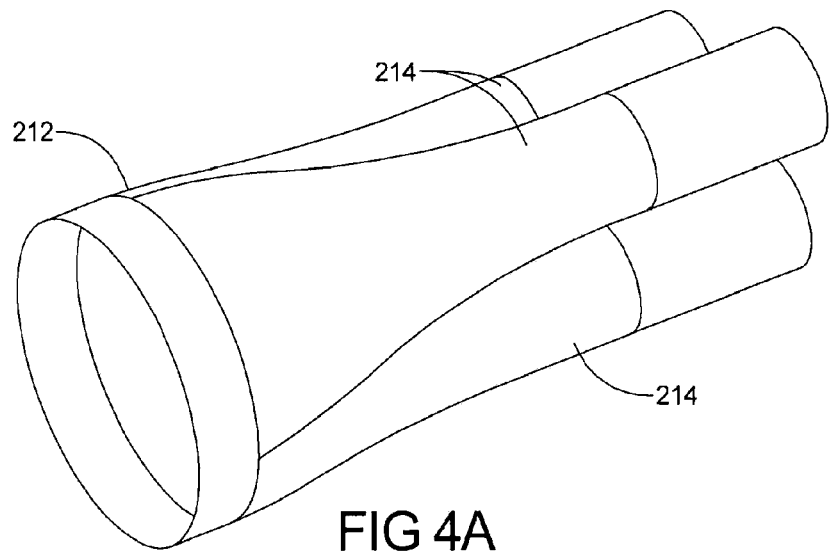
FIG 4A
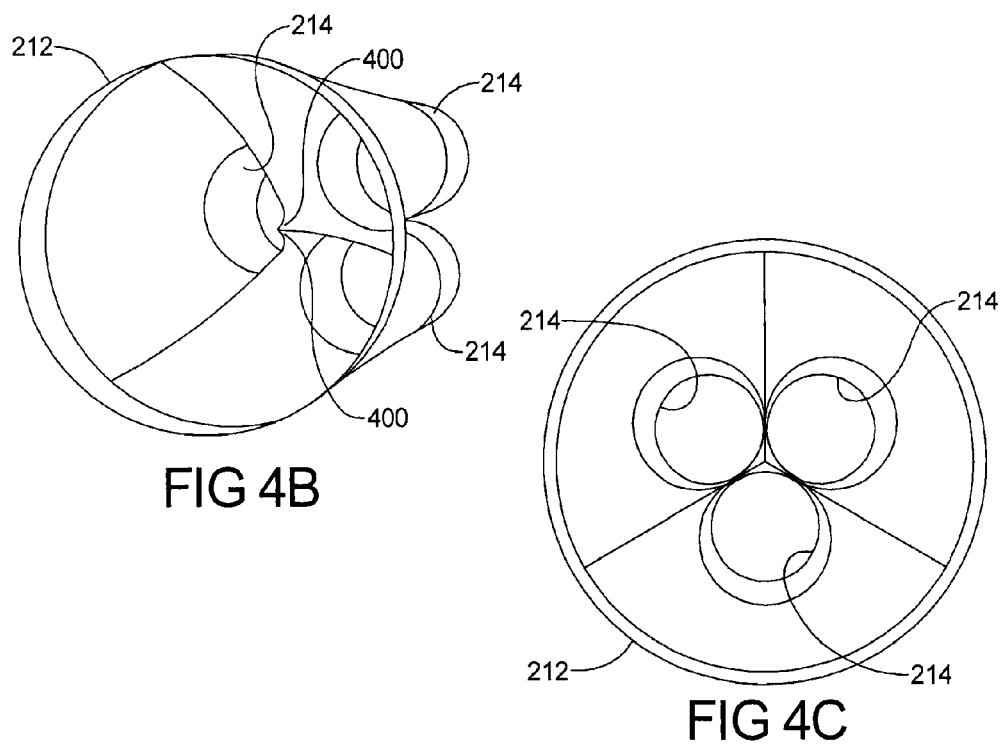
FIG 4B
FIG 4C

CONFORMABLE HIGH PRESSURE GASEOUS FUEL STORAGE SYSTEM HAVING A GAS STORAGE VESSEL WITH FRACTAL GEOMETRY

FIELD

The present disclosure relates generally to a fuel storage system and, more particularly, to a conformable high pressure gaseous fuel storage system for a vehicle.

BACKGROUND

Fuel tanks in automotive vehicles, passenger vehicles in particular, take on a variety of shapes. Fuel tanks for passenger vehicles (which includes trucks such as pick-up trucks) tend to conform to "left over space" by vehicle designers so there is no common design shapes between vehicle models. These fuel tanks are often made of inexpensive polymers or metals using simple forming techniques, such as blow molding or stamping. Fuel vessels for gaseous fuels for future vehicles, particularly those for passenger vehicles, will likely not receive much relief from the foregoing constraints.

The use of gaseous fuels, such as hydrogen or compressed natural gas, for vehicles is generally known. Such fuels can represent an alternative to petroleum as a fuel source for automotive vehicles, but are generally required to be stored at an elevated or high pressure in a storage vessel. Typical storage vessels and their associated mounting systems for compressed gaseous fuels include various components that can raise the cost and complexity of manufacturing an alternative fuel vehicle. In addition, such storage vessel systems often result in a loss of interior cabin volume or trunk volume in an automotive vehicle. Also, such storage vessel systems often utilize one or more cylindrical storage vessels which can present difficulties in fitting the storage vessel system into available space in the vehicle and may require modifying aspects of the vehicle that surround the storage vessel system. The lower storage density of the gaseous fuels compared to gasoline or diesel fuel further exasperates the problem.

Current technologies for high pressure storage vessels typically employ either metal or filament wound cylinders. The drawbacks of these designs include cost and the inability to package efficiently in vehicle architectures.

It is known that at a given pressure, the smaller the diameter of a spherical or cylindrical pressure vessel, the smaller the wall thickness required to contain the pressure. This is represented by the following equation:

$$T_m = \frac{PD_o}{2S_o} \rightarrow T_m \propto D_o$$

Where $T_m$=min. pipe thickness, P=internal pressure, $D_o$=diameter of the pipe, and $S_o$=tensile strength of the material of which the pipe is made. Based on this relationship, a larger pressure vessel may be constructed from a combination of many smaller tubes and/or spheres. The simplest example would be an array of small diameter tubes arranged in a cubic closed packing (ccp) or hexagonal tube packing structure. Examples of previous attempts to construct conformable pressure vessels based on the small diameter concept include polymeric/aluminum foam, glass microspheres, dog bone concepts, and pillow concepts. The polymeric/aluminum foam concept involves the use of polymeric or metallic foam to create thousands of small spheres packed into a fuel vessel shape.

The glass microspheres concept by the Savannah River National Lab and Alfred University applied the concept of small diameter thin wall pressure vessels in the form of hollow glass microspheres. These spheres could be poured into any shape of vessel desired. However, the glass microspheres required high energy microwaves to open pores that would allow gas in/out.

The dog bone concepts by Lawrence Livermore National Lab utilized the concept of internal load bearing structures to alleviate pressure from the skin. This concept however was still limited to simple geometric shapes such as cubes and introduced many potential leak points at all the joints.

The pillow concepts typically blended several conventional vessels together to provide a flatter shape. They worked on the basis that sections of the vessel that butted against each other would lead to forces that cancel each other out and thus allow a more conformable shape. While a number of these concepts were successful in retaining the desired pressure, they were bulky, heavy and expensive to manufacture.

Thus, there remains a need in the relevant art for a conformable high pressure gaseous fuel storage system that overcomes the aforementioned and other disadvantages.

SUMMARY

In accordance with an aspect of the present disclosure, a conformable high pressure gaseous fuel storage system has a high pressure gaseous storage vessel with a central section disposed between end sections and in fluid communication therewith. The end and central sections have hollow geometric objects. The geometric objects have self-similarity providing the gaseous storage vessel with a fractal geometry. Each geometric object of each end section branches into a plurality of the geometric objects of the central section. The geometric objects of the central section have a smaller cross-section and thinner outer wall than the geometric objects of the end sections. The geometric objects of at least the central section are bendable to a configuration to conform the gas storage vessel to a space in a vehicle in which the gas storage vessel is packaged. In an aspect, each flow path through the geometric objects has essentially the same equivalent flow resistance.

In accordance with an aspect of the present disclosure, the end sections include a plurality of sections arranged from outer to inner having the hollow geometric objects that have the self-similarity. Each geometric object of a section of each end section adjacent a more inner section of that outer section branches into a plurality of the geometric objects of the more inner adjacent section. The geometric objects of an innermost section of each end section are the geometric objects that branch into the geometric objects of the central section.

In accordance with an aspect of the present disclosure, an outermost section of each end section has one geometric object. In accordance with an aspect of the present disclosure, the outermost section of one end section has an inlet of the high pressure gaseous storage vessel and the outermost section of the other end section having an outlet of the high pressure gaseous storage vessel. In accordance with an aspect of the present disclosure, the outermost section of one end section has both the inlet and outlet of the high pressure gaseous storage vessel. In an aspect, the outermost section of one end section has a port that provides both the inlet and outlet of the high pressure gaseous storage vessel.

In accordance with an aspect of the present disclosure, an outermost section of

In accordance with an aspect of the present disclosure, the geometric objects are tubes. In accordance with an aspect of the present disclosure, the tubes are cylindrical tubes.

In accordance with an aspect of the present disclosure, the cylindrical tubes of at least the central section are oriented with respect to each other in a flat configuration.

In accordance with an aspect of the present disclosure, the cylindrical tubes of at least the central section are oriented with respect to each other in a matrix configuration.

In accordance with an aspect of the present disclosure, each cylindrical tube that branches into the plurality of cylindrical tubes branches into two cylindrical tubes. In accordance with an aspect of the present disclosure, each cylindrical tube that branches into the plurality of cylindrical tubes branches into three cylindrical tubes. In accordance with an aspect of the present disclosure, each cylindrical tube that branches into the plurality of cylindrical tubes branches into four cylindrical tubes. In accordance with an aspect of the present disclosure, each cylindrical tube that branches into the plurality of cylindrical tubes branches into five cylindrical tubes.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 4A-4C are perspective views from a side, an end angle and an end, respectively, of a portion of the conformable high pressure gaseous fuel storage system of FIG. 3 where a larger diameter tube branches to a plurality of smaller diameter tubes.

DETAILED DESCRIPTION

A fractal as used herein and as would be commonly understood, is a rough or fragmented geometric object that can be split into parts, each of which is approximately a reduced size copy of the whole—a property known as "self-similarity." That is, the object has a geometric shape having self-similarity on all scales. It should be understood that this means that the object has the same type of structure at all scales.

Figure 1:
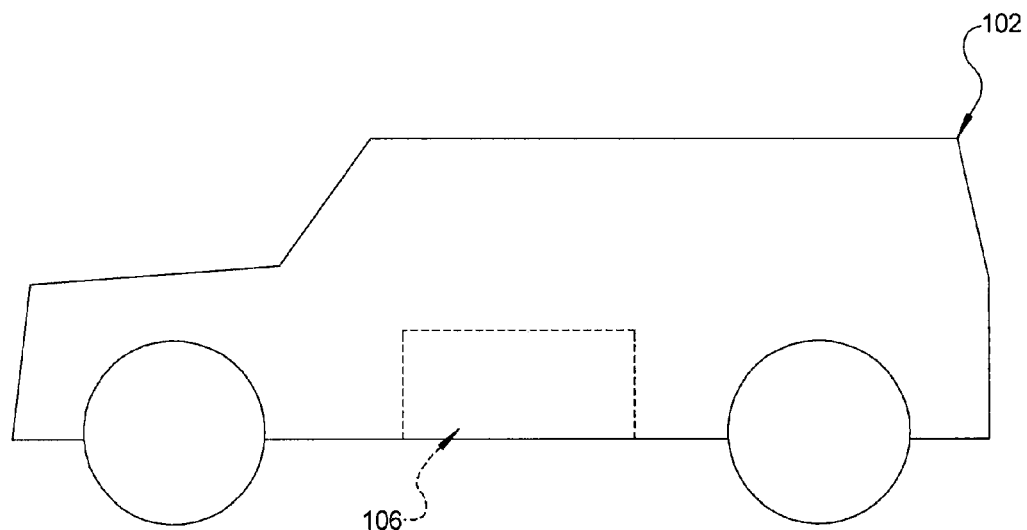
FIG. 1 is perspective view of a conformable high pressure gaseous fuel storage system in accordance with an aspect of the present disclosure shown in association with an exemplary vehicle.

FIG. 1 shows a conformable high pressure gaseous fuel storage system 100 for storage of a high pressure gaseous fuel in association with an exemplary vehicle 102 in accordance with the present teachings. High pressure for the purposes herein means a pressure of sixty psi or higher. In an aspect, the gaseous fuel can be compressed natural gas or hydrogen. It should be understood that other types of gaseous fuels can be stored in fuel storage system 100, such as propane. In the exemplary configuration illustrated, vehicle 102 is an automotive passenger vehicle, such as a sport utility vehicle. It should be appreciated that vehicle 102 can be an automotive vehicle other than a sport utility vehicle.

Figure 2:
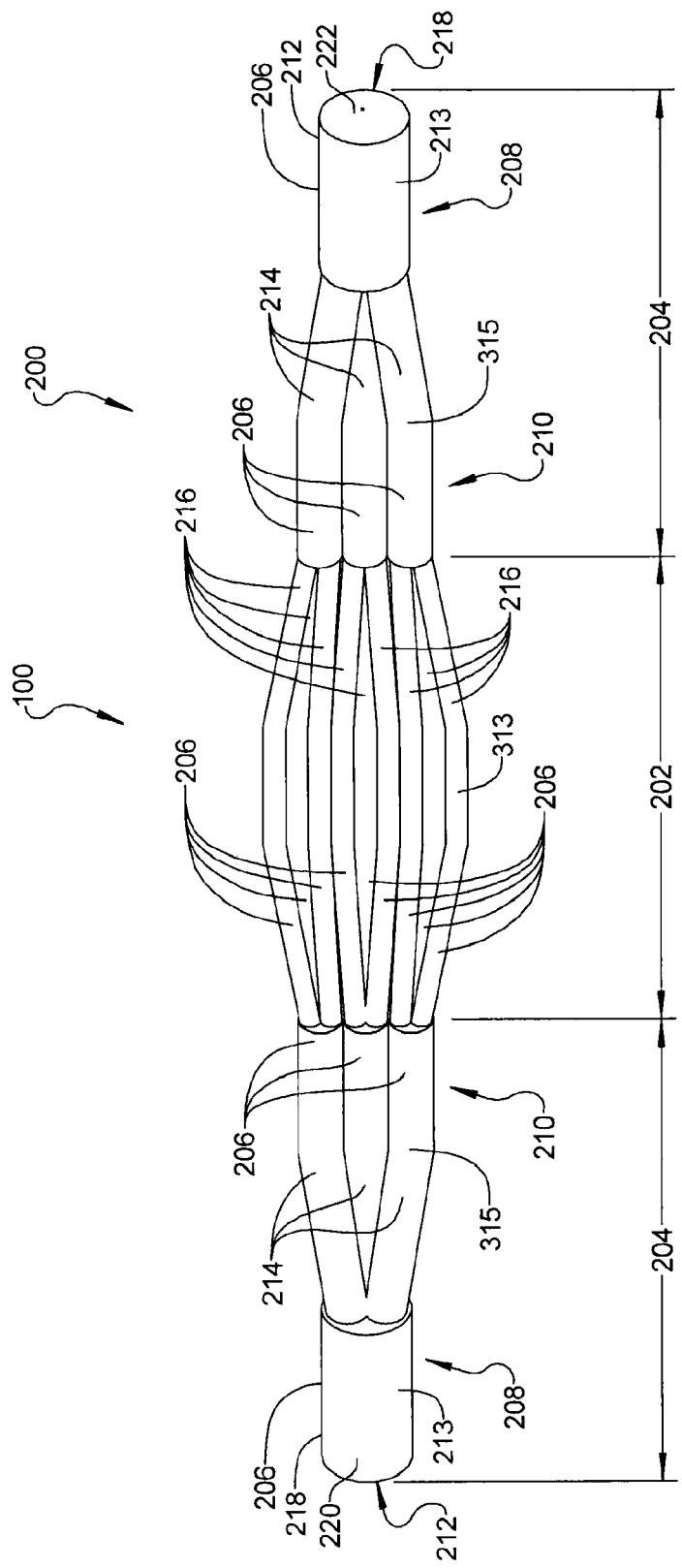
FIG. 2 is a perspective view of an embodiment of a conformable high pressure gaseous fuel storage system in accordance with an aspect of the present disclosure.

With reference to an example embodiment shown in FIG. 2, high pressure gaseous fuel storage system 100 has a high pressure gaseous storage vessel 200 having a central section 202 disposed between end sections 204 in fluid communication therewith. The end and central sections have hollow geometric objects 206. The geometric objects have self-similarity providing gas storage vessel 200 with a fractal geometry. The term "geometric object" as used herein means a hollow structure having a geometric shape. Since each geometric object is hollow, it has a flow passage extending therethrough. The geometric objects are formed so that each individual flow path through the geometric objects has essentially the same equivalent resistance. In this context, an individual flow path is the flow path through one of the geometric objects of the central section and through the geometric objects of the end sections that are in series with that geometric object of the central section.

In the illustrative embodiment of FIG. 2, the geometric objects are cylindrical tubes with fuel storage system 100 having contoured cylindrical tube fractal geometry comprising an arrangement of cylindrical tubes in an artery, capillary, vein configuration. In this configuration, each artery tube branches into a plurality of tubes having a smaller diameter and thinner wall until branching into the cylindrical tubes in the central section that have the smallest diameter. Similarly, each vein tube branches into a plurality of tubes having a smaller diameter and thinner wall until branching into the tubes of the central section. A used herein, the term "cylindrical tube" means a tube having a cylindrical cross-section but that can have bends along its length and need not be straight. An individual flow path in the embodiment of FIG. 2 is the flow path through one of the cylindrical tubes of the central section and the artery and vein cylindrical tubes that are in series with that cylindrical tube of the central section. As discussed above, the cylindrical tubes of each section are formed so that each of the individual flow paths have essentially the same equivalent flow resistance.

Each end section 204 may include a plurality of sections arranged outer to inner having the hollow geometric objects 106 having the self-similarity. In the embodiment of FIG. 2, each end section 204 includes two such sections, an outermost section 208 and an innermost section 210. It should be understood that each end sections 204 can include more than two sections, or could be one section. The outermost section 208 illustratively includes one cylindrical tube 212 that branches into three cylindrical tubes 214 of innermost section 210 that have a smaller diameter and thinner outer wall 215 than the diameter and outer wall 212 of cylindrical tube 212. Each cylindrical tube 214 branches into three cylindrical tubes 216 of central section 202 that have a smaller diameter and thinner outer wall 217 than the diameter and outer wall 215 of cylindrical tube 214.

Figure 3:
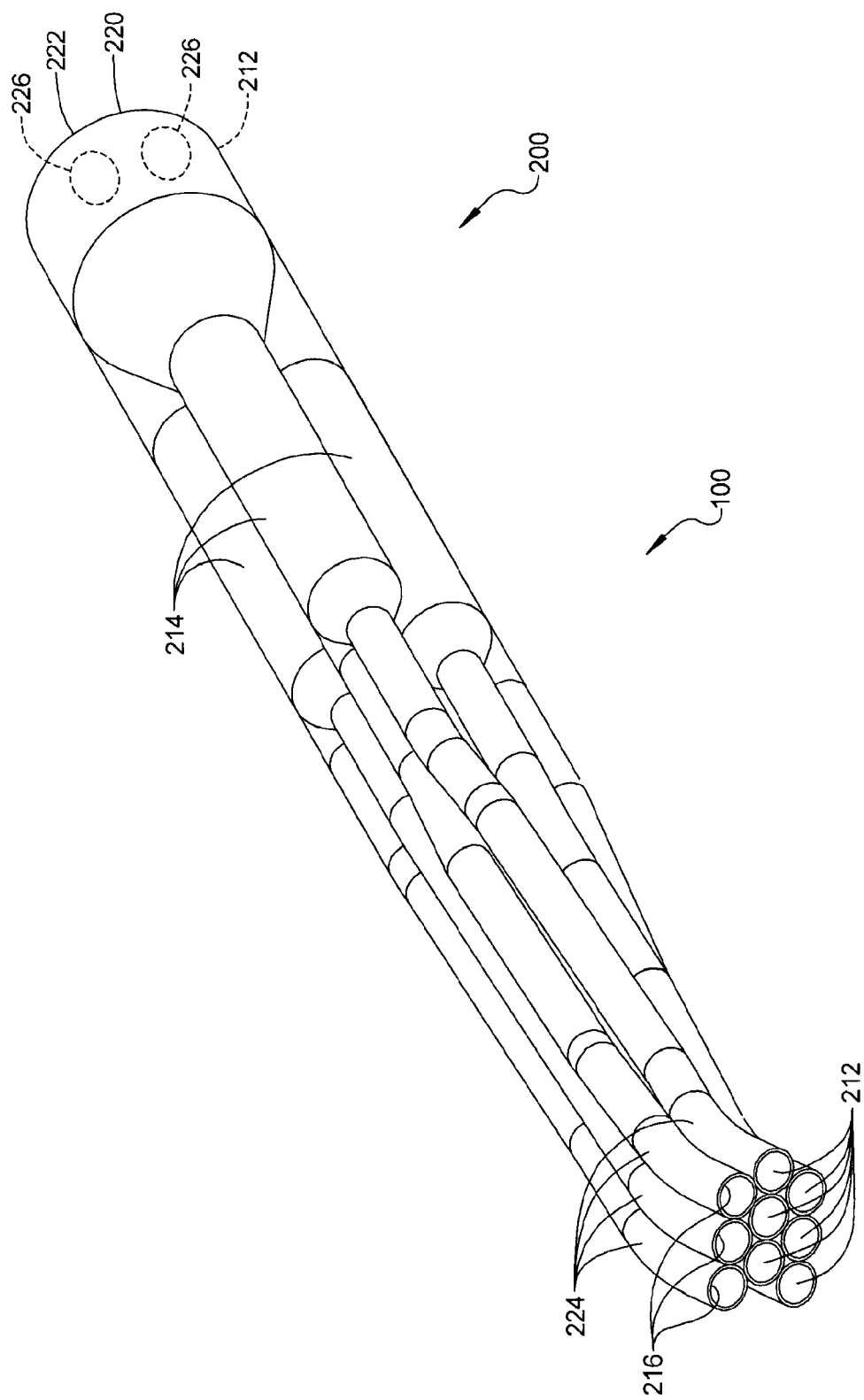
FIG. 3 is a partial perspective view of another embodiment of a conformable high pressure gaseous fuel storage system in accordance with an aspect of the present disclosure.

Cylindrical tubes 212 of outermost sections 208 of end sections 204 may have open outer ends 218. The open outer end 218 of cylindrical tube 212 of one end section 204 may provide an inlet 220 of gas storage vessel 200 and the open outer end 218 of the cylindrical tube 212 of the other end section 204 may provide an outlet 222 of gas storage vessel 200. It should be understood that the open outer end 218 of cylindrical tube 212 of one end section 204 may provide both inlet 220 and outlet 222 of gas storage vessel 200 (FIG. 3). It should also be understood that the cylindrical tubes 212 can have one or more ports 226 shown in phantom in FIG. 3 that provide the inlet 220 and outlet 222. In this regard, it should be understood that the same port or ports 226 can provide both the inlet 220 and outlet 222. It should also be understood that where port or ports 226 provide inlet 220 and/or outlet 222, the outer end 218 of that end section 204 may be closed.

In the exemplar embodiment of FIG. 2, tubes 214 of innermost section 210 of each end section 204 are oriented in a flat configuration with respect to each other as are tubes 216 of central section 202. It should be understood that tubes 214 could be oriented with respect to each other in configurations other than a flat configuration as could tubes 216. For example, with reference to an exemplar embodiment shown in FIG. 3, tubes 214 could be arranged in a matrix configuration with respect to each other as could tubes 216. The matrix configuration, which is a triangular configuration in the exemplar embodiment of FIG. 3, results in at least one of the tubes 216 being completely surrounded by other of the central tubes 2126

Fuel storage system 100 is conformable as the tubes of which it is made, the smaller diameter, thinner wall tubes in particular such as tubes 216 of central section 202, can be formed with bends so that tubes 216 conform gas storage vessel 200 to fit into available space in a vehicle. As seen in the exemplar embodiment of FIG. 3, tubes 216 have a bend 224 spaced from where tubes 214 branch into tubes 216.

In an aspect, there is a gradual transition at transition region 400 where each larger diameter tube branches into the plurality of smaller diameter, thinner wall tubes. FIGS. 4A-4C show the gradual transition of a tube 212 into three tubes 214.

Figure 5:
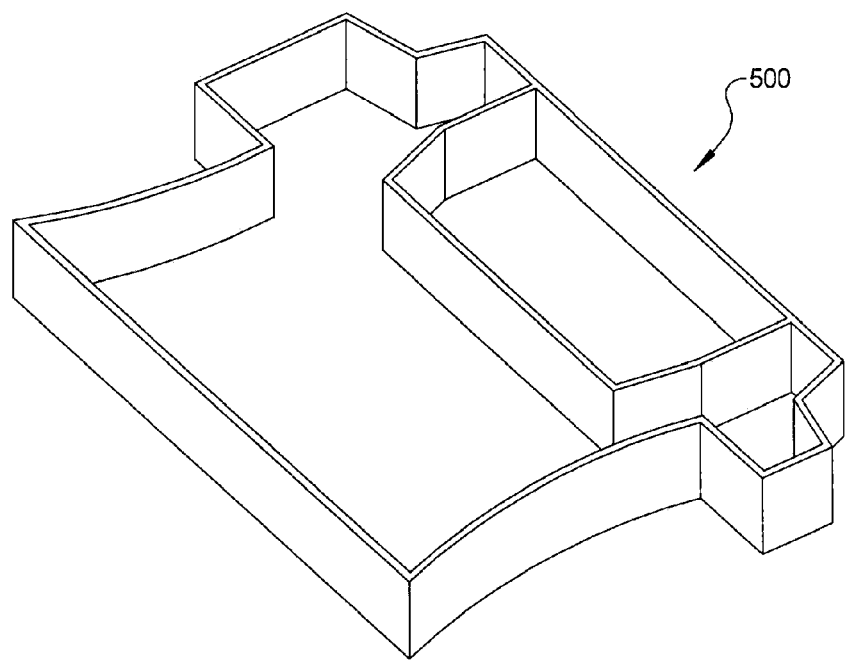
FIG. 5 is a perspective view of a portion of a motor vehicle in which a conformable high pressure gaseous fuel storage system in accordance with an aspect of the present disclosure is received.

FIG. 5 shows a portion 500 of a vehicle, such as vehicle 102 of FIG. 1, having space 502 for receiving fuel storage system 100. The tubes of fuel storage system 100 are formed with bends to conform gas storage vessel 200 of fuel storage system 100 to space 502 so that gas storage vessel 200 can be packaged into space 502. In an example, space 502 has a volume of about 270 liters and fuel storage system 100 has a volume of about 170 liters. In this illustrative example, fuel storage system 100 holds 170 liters of compressed natural gas at a pressure of up to 3600 PSI. In an illustrative example, the cylindrical tubes may be made of a high strength polymer—a polymer that has sufficient strength to withstand the pressure of the gas within gas storage vessel 200 at the maximum rated pressure. In the illustrative example of FIG. 2, the tubes 216 of central section 202 may have an inside diameter of 0.4 inches, the tubes 214 of section 210 may have an inside diameter of 0.5 inches and the tubes 212 of section 208 may have an inside diameter of 1.0 inches.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A conformable high pressure gaseous fuel storage system, comprising:
    a high pressure gaseous storage vessel with a central section disposed between end sections and in fluid communication therewith;
    the end and central sections having hollow geometric objects, the geometric objects having self-similarity providing the high pressure gaseous storage vessel with a fractal geometry;
    each geometric object of each end section branching into a plurality of the geometric objects of the central section, the geometric objects of the central section having a smaller cross-section and thinner outer wall than the geometric objects of the end sections, the geometric objects of at least the central section formable with bends to a configuration to conform the gas storage vessel to a space in a vehicle in which the gas storage vessel is packaged; and
    each end section includes a plurality of sections arranged in series with each other with each such section having the hollow geometric objects having the self-similarity, each geometric object of each section of each end section branching into the plurality of the geometric objects of a more inner adjacent section of the end section, the geometric objects of an innermost section of each end section being the geometric objects that branch into the geometric objects of the central section.

2. The gaseous fuel storage system of claim 1 wherein an outermost section of each end section has one geometric object.

3. The gaseous fuel storage system of claim 2 wherein the outermost section of one end section has an inlet of the gaseous storage vessel and the outermost section of the other end section having an outlet of the gas storage vessel.

4. The gaseous fuel storage system of claim 1 wherein the outermost section of one end section has an inlet of the gaseous storage vessel and also an outlet of the gaseous storage vessel.

5. The gaseous fuel storage system of claim 4 wherein the inlet and outlet are common.

6. The gaseous fuel storage system of claim 2 wherein the geometric objects are tubes.

7. The gaseous fuel storage system of claim 6 wherein the tubes are cylindrical tubes.

8. The gaseous fuel storage system of claim 7 wherein the cylindrical tubes of at least the central section are oriented with respect to each other in a flat configuration.

9. The gaseous fuel storage system of claim 7 wherein the cylindrical tubes of at least the central section are oriented with respect to each other in a matrix configuration.

10. A conformable high pressure gas fuel storage system, comprising:
    a high pressure gaseous storage vessel with a central section disposed between end sections and in fluid communication therewith;
    the end and central sections having hollow cylindrical tubes, the cylindrical tubes having self-similarity providing the gaseous storage vessel with a fractal geometry;
    each cylindrical tube of each end section branching into a plurality of the cylindrical tubes of the central section, cylindrical tubes of the central section having a smaller diameter and a thinner outer wall than the cylindrical tubes of the end sections, the cylindrical tubes of at least the central section formable with bends to a configuration to conform the gas storage vessel to a space in a vehicle in which the gaseous storage vessel is packaged; and the end sections include a plurality of sections arranged in series with each other, each cylindrical tube of a section of each end section branching into a plurality of the cylindrical tubes of a more inner adjacent section of the end section, the cylindrical tubes of an innermost section of each end section being the cylindrical tubes of the end sections that branch into the cylindrical tubes of the central section.

11. The gaseous fuel storage system of claim 10 wherein an outermost section of each end section has one cylindrical tube.

12. The gaseous fuel storage system of claim 11 wherein the outermost section of one end section has an inlet of the gas storage vessel and the outermost section of the other end section has an outlet of the gas storage vessel.

13. The gaseous fuel storage system of claim 11 wherein the outermost section of one end section has an inlet of the gaseous storage vessel and also an outlet of the gaseous storage vessel.

14. The gaseous fuel storage system of claim 13 wherein the inlet and outlet are common.

15. The gaseous fuel storage system of claim 10 wherein the cylindrical tubes of at least the central section are oriented with respect to each other in a flat configuration.

16. The gaseous fuel storage system of claim 10 wherein the cylindrical tubes of at least the central section are oriented with respect to each other in a matrix configuration.

* * * * *